(12) United States Patent
Voss et al.

(10) Patent No.: US 10,407,172 B2
(45) Date of Patent: Sep. 10, 2019

(54) CABLE GUIDE ARRANGEMENT FOR A LUGGAGE BIN

(71) Applicant: Airbus Operations GmbH, Hamburg (DE)

(72) Inventors: Jens Voss, Hamburg (DE); Philipp Kramer, Lueneburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 364 days.

(21) Appl. No.: 15/428,908

(22) Filed: Feb. 9, 2017

(65) Prior Publication Data
US 2017/0152045 A1    Jun. 1, 2017

Related U.S. Application Data

(63) Continuation of application No. PCT/EP2015/068380, filed on Aug. 10, 2015.

(30) Foreign Application Priority Data

Aug. 14, 2014    (DE) ........................ 10 2014 012 125

(51) Int. Cl.
    *B64D 11/00*      (2006.01)
(52) U.S. Cl.
    CPC .................. *B64D 11/003* (2013.01)
(58) Field of Classification Search
    CPC .................................................. B64D 11/003
See application file for complete search history.

(56) References Cited

U.S. PATENT DOCUMENTS

| | | | |
|---|---|---|---|
| 5,921,670 A | 7/1999 | Schumacher et al. | |
| 7,723,935 B2 * | 5/2010 | Kneller | B64D 11/003 |
| | | | 224/282 |

(Continued)

FOREIGN PATENT DOCUMENTS

| | | |
|---|---|---|
| DE | 29906645 | 8/2000 |
| DE | 60104358 | 8/2005 |

(Continued)

OTHER PUBLICATIONS

German Search Report, dated Jun. 5, 2015, priority document.
International Search Report, dated Oct. 20, 2015, priority document.

*Primary Examiner* — Brian M O'Hara
*Assistant Examiner* — Michael B. Kreiner
(74) *Attorney, Agent, or Firm* — Greer, Burns & Crain, Ltd.

(57) ABSTRACT

A cable guide arrangement for use in a luggage bin, in particular an aircraft luggage bin, comprises a shaft bearing element and a shaft element rotatably mounted in the shaft bearing element and through which there passes an opening extending along a central axis of the shaft element. The cable guide arrangement further comprises at least one cable guide element connected to the shaft bearing element or to the shaft element and comprising a first and a second guide portion. The first guide portion is configured to deflect a cable, extending in the radial direction with respect to the central axis of the shaft element, with a defined bending radius in the direction of the central axis of the shaft element. The second guide portion is configured to guide the cable parallel to the central axis of the shaft element through the opening extending through the shaft element.

16 Claims, 7 Drawing Sheets

(56) References Cited

U.S. PATENT DOCUMENTS

| | | | | |
|---|---|---|---|---|
| 7,762,737 B2* | 7/2010 | Schmitz | ............... | B60R 5/003 244/118.1 |
| 7,893,645 B2* | 2/2011 | Kneller | ............... | B64D 11/003 312/248 |
| 7,938,363 B2 | 5/2011 | Benkart et al. | | |
| 8,439,589 B2* | 5/2013 | Winkler | ............... | B64D 11/003 403/119 |
| 8,770,515 B1* | 7/2014 | Cloud | ............... | G05G 17/00 244/118.5 |
| 8,899,390 B2* | 12/2014 | Kearsey | ............... | F16F 9/3207 188/291 |
| 9,371,674 B2* | 6/2016 | Daul | ............... | E05D 11/00 |
| 9,578,962 B2* | 2/2017 | Schmitz | ............... | A47B 46/00 |
| 2008/0078871 A1* | 4/2008 | Munson | ............... | B64D 11/003 244/118.5 |
| 2011/0140462 A1 | 6/2011 | Lin et al. | | |
| 2012/0038253 A1 | 2/2012 | Rafler et al. | | |

FOREIGN PATENT DOCUMENTS

| | | |
|---|---|---|
| DE | 102009057900 | 6/2011 |
| DE | 102010034027 | 2/2012 |
| DE | 102005033259 | 3/2012 |
| EP | 2332833 | 6/2011 |

* cited by examiner

CABLE GUIDE ARRANGEMENT FOR A LUGGAGE BIN

CROSS-REFERENCES TO RELATED APPLICATIONS

This application is a continuation of International Application PCT/EP2015/068380 filed Aug. 10, 2015, designating the United States and published on Feb. 18, 2016 as WO 2016/023866. This application also claims the benefit of the German patent application No. 10 2014 012 125.9 filed on Aug. 14, 2014. The entire disclosures of the above are incorporated herein by way of reference.

BACKGROUND OF THE INVENTION

The invention relates to a cable guide arrangement for use in a luggage bin, in particular an aircraft luggage bin. The invention relates further to a luggage bin equipped with such a cable guide arrangement.

In a passenger cabin of a modern commercial aircraft there are provided a plurality of overhead luggage bins which are installed along a longitudinal axis of the passenger cabin above rows of passenger seats. Luggage bins with a lowerable shell, so-called "movable bins," such as are described, for example, in DE 10 2005 33 259 B4 or U.S. Pat. No. 7,938,363, advantageously permit optimum use of space and at the same time high ease of use. Such luggage bins comprise a housing as well as a lowerable shell which is pivotable between a closed transport position, in which optimum head room for the passengers seated beneath the luggage bins is ensured, and an open loading or unloading position. In the loading or unloading position, even shorter people can comfortably deposit items of luggage in the shell or remove them therefrom.

DE 10 2010 034 027 A1 discloses a luggage bin having a housing half-shell in which a compartment provided with an electrical component is held so as to be pivotable about a pivot axis. The pivot axis extends through two shafts which connect the compartment to the housing half-shells, one of which shafts has a through-hole extending in the axial direction through which a cable for connection of the electrical component is guided. On an outer side of a housing shell side wall, the cable is guided through a channel formed by two mutually opposite guide rollers.

DE 601 04 358 T2 describes a motor vehicle having a dashboard and a storage module which is arranged to be pivotable relative to the dashboard about an axis. The pivot axis is in the form of a hollow shaft inside which there extend cables for supplying power to members that are formed integrally with the storage module.

SUMMARY OF THE INVENTION

An object underlying the invention is to provide a cable guide arrangement for use in a luggage bin, in particular an aircraft luggage bin, which allows a cable to be guided into an interior of the luggage bin in a manner that is more secure and less susceptible to faults. The object underlying the invention is further to provide a luggage bin equipped with such a cable guide arrangement.

A cable guide arrangement suitable for use in a luggage bin, in particular an aircraft luggage bin, comprises a shaft bearing element and a shaft element which is rotatably mounted in the shaft bearing element and through which there passes an opening extending along a central axis of the shaft element. The shaft bearing element is intended, in particular, to be connected to the housing in a luggage bin that comprises a housing and a shell which is pivotable relative to the housing between a closed transport position and an open loading or unloading position. The shaft element, on the other hand, is preferably intended to be connected to the shell, which is pivotable relative to the housing, that is to say to form the pivot axis about which the shell is pivotable relative to the housing. Owing to the opening formed in the shaft element, a cable, for example, may be guided from outside the luggage bin into an interior of the luggage bin, that is to say into an interior of the shell of the luggage bin. The cable may serve, for example, to supply electrical energy to an electrical or electronic component which is provided in the interior of the luggage bin, for example, a light source.

The cable guide arrangement further comprises a cable guide element which is connected to the shaft bearing element or to the shaft element and comprises a first guide portion and a second guide portion. The first guide portion is configured to deflect a cable, which extends in the radial direction with respect to the central axis of the shaft element, with a defined bending radius in the direction of the central axis of the shaft element. The first guide portion thus reliably prevents the cable from being guided with an undesirably small or undesirably large bending radius into the opening extending through the shaft element. Damage to the cable can thus be prevented.

The second guide portion of the cable guide element is configured to guide the cable parallel to the central axis of the shaft element through the opening extending through the shaft element. The second guide portion accordingly ensures that the cable is also guided in a defined manner, ideally approximately coaxially with the central axis of the shaft element, through the opening formed in the shaft element. As a result, it is possible, on the one hand, to prevent the rotary movement of the shaft element relative to the shaft bearing element from being impeded by the cable. On the other hand, by specifying a defined cable path through the opening formed in the shaft element, the second guide portion protects the cable from damage, in particular, when the shaft element moves relative to the shaft bearing element.

The cable guide arrangement, accordingly, allows a cable to be guided in a manner that is more secure and less susceptible to faults into an interior of a luggage bin that comprises a housing and a shell pivotable relative to the housing. In addition, the cable guide arrangement has only a small number of individual parts and is therefore comparably simple and inexpensive to produce and fit.

The first guide portion of the cable guide element preferably extends radially outwards with respect to the central axis of the shaft element from the second guide portion. It is thus ensured that a cable that extends in the radial direction with respect to the central axis of the shaft element first comes into contact with the first guide portion and is deflected by the first guide portion with a defined bending radius in the direction of the central axis of the shaft element, before the cable, guided by the second guide portion of the cable guide element, is guided through the opening formed in the shaft element. The first guide portion of the cable guide element may comprise a bearing surface for the cable, on which the cable rests. The path of the cable resting on the bearing surface of the first guide portion can thereby be adapted in a simple manner to the shape of the bearing surface.

The bearing surface of the first guide portion may have, at least in a region adjoining the second guide portion, a curvature which is adapted to a defined bending radius with which the cable is to be deflected in the direction of the central axis of the shaft element. Accordingly, by simply adapting the geometry of the bearing surface, it can be ensured with a high degree of reliability that the cable is always deflected with the desired bending radius in the direction of the central axis of the shaft element.

For example, the bearing surface of the first guide portion may be curved in the manner of a funnel, at least in a region adjoining the second guide portion. By means of a bearing surface curved in the manner of a funnel, the cable is deflected in the direction of the central axis of the shaft element in a continuous manner, which thus protects the cable.

In principle, the first guide portion of the cable guide element may extend radially outwards from an axial end portion of the second guide portion. Alternatively, however, it is also conceivable that the first guide portion extends radially outwards from the second guide portion at a distance from an axial end of the second guide portion, that is to say, the second guide portion projects beyond the first guide portion in the axial direction. In particular, the second guide portion may project beyond the first guide portion in the axial direction in an inner region of a bearing surface of the first guide element that is curved in the manner of a funnel. Such a design of the cable guide element ensures an optimum transition of the cable from guiding by the first guide portion to the second guide portion of the cable guide element.

The second guide portion of the cable guide element may comprise two guide ribs which extend parallel to one another and parallel to the central axis of the shaft element. The guide ribs are, in particular, configured to receive the cable between them and to guide it parallel to, in particular coaxially with, the central axis of the shaft element through the opening extending through the shaft element. The two guide ribs arranged parallel to one another ensure that the cable is guided securely through the opening formed in the shaft element.

The second guide portion may further comprise a receiving portion which extends between the guide ribs parallel to the central axis of the shaft element. In particular, the receiving portion may extend substantially coaxially with the central axis of the shaft element, so that a cable received by the receiving portion is guided through the opening formed in the shaft element substantially coaxially with the central axis of the shaft element. The receiving portion preferably has a receiving surface for receiving the cable which is adapted to the cross-section of the cable. For example, the receiving surface may be in the form of a portion of an inner surface of a hollow cylinder when the cable has a round cross-section. It can thus be ensured that the cable is received securely in the receiving portion of the second guide portion. The receiving surface of the receiving portion is preferably in such a form that it extends over more than 50% of the circumferential surface of the cable, whereby it can be ensured that the cable can be held securely in the receiving portion of the second guide portion.

Mutually facing side surfaces of the guide ribs are preferably at a distance from one another that increases in the radial direction with respect to the central axis of the shaft element, starting from the receiving portion. By means of such a design of the guide ribs, a cable that is received in the receiving portion of the second guide portion can be released comparatively simply from the second guide portion because the cable merely has to be removed from the receiving portion, and the dismantling operation is not impeded by the guide ribs.

In a preferred embodiment of the cable guide arrangement, the cable guide element comprises a fastening element which is engaged with a complementary fastening element formed on the shaft bearing element or on the shaft element. Cooperation of the fastening element formed on the cable guide element with the complementary fastening element formed on the shaft bearing element, or on the shaft element, allows the cable guide element to be mounted simply and quickly, but nevertheless securely, on the shaft bearing element or on the shaft element.

The fastening element of the cable guide element may extend parallel to the central axis of the shaft element from a surface of the first guide portion located opposite the bearing surface. In other words, the fastening element preferably extends from a surface of the first guide portion that faces the opening formed in the shaft element and is thus particularly suitable for cooperating in a simple manner with a complementary fastening element of the shaft bearing element or of the shaft element in order to connect the cable guide element to the shaft bearing element or to the shaft element.

The complementary fastening element formed on the shaft bearing element or on the shaft element may extend in the radial direction with respect to the central axis of the shaft element from an inner surface of the shaft bearing element or of the shaft element. In other words, the complementary fastening element formed on the shaft bearing element or on the shaft element may project from an inner circumferential surface of the shaft bearing element or of the shaft element radially inwards in the direction of the central axis of the shaft element, so that it can be brought into engagement in a simple manner with a fastening element which is formed on the cable guide element and which extends parallel to the central axis of the shaft element from a surface of the first guide portion that is opposite the bearing surface.

In particular, the complementary fastening element formed on the shaft bearing element or on the shaft element may have an engagement opening for receiving the fastening element of the cable guide element. The shape of the engagement opening is preferably adapted to a cross-section of the fastening element formed on the cable guide element. Such a design of the complementary fastening element allows the cable guide element to be mounted in a particularly simple manner on the shaft bearing element or on the shaft element.

In a preferred embodiment, the cable guide arrangement comprises a first cable guide element, which is connected to the shaft bearing element, with respect to the central axis of the shaft element, in the region of a first end of the cable guide arrangement. The cable guide arrangement may further comprise a second cable guide element, which is connected to the shaft element, with respect to the central axis of the shaft element, in the region of a second end of the cable guide arrangement that is opposite the first end. In other words, the cable guide arrangement may have two cable guide elements which are provided at opposite ends of the cable guide arrangement and consequently ensure that a cable that extends in the radial direction with respect to the central axis of the shaft element on both sides of the opening formed in the shaft element can be guided by a cable guide element, deflected with a defined bending radius in the direction of the central axis of the shaft element and, as desired, guided through the opening formed in the shaft element.

When the cable guide arrangement comprises two cable guide elements, the first and second cable guide element are preferably arranged at such a distance from one another, in the direction of the central axis of the shaft element, that the cable, which is guided through the opening extending through the shaft element, is able to twist, as a result of a torsional load acting upon the cable when the shaft element rotates relative to the shaft bearing element, without the cable being damaged. In other words, in dependence on the mechanical properties and the geometry of the cable, the distance of the cable guide elements in the direction of the central axis of the shaft element is preferably so chosen that a movement of the shaft element relative to the shaft bearing element, which necessarily results in a torsional load on the cable, leads to the cable being twisted but not damaged.

Finally, the cable guide arrangement may comprise a cover element connected to the shaft element. The cover element may be connected to the shaft bearing element by suitable fastening components, for example screws, fastening pins or the like. When the cable guide arrangement is mounted in a luggage bin, the cover element preferably rests on an outer surface of a side wall of the luggage bin housing.

A luggage bin comprises a housing. The housing is preferably a component that is mounted in a structurally fixed manner, that is to say a component that is provided, for example, for fastening to a structural element of an aircraft or other transport means. The luggage bin further comprises a shell which is pivotable relative to the housing between a closed transport position and an open loading or unloading position. Finally, the luggage bin is equipped with an above-described cable guide arrangement, wherein a pivot axis about which the shell is pivotable relative to the housing is formed by the shaft element of the cable guide arrangement. By means of the cable guide arrangement, a cable, which serves, for example, to supply electrical energy to an electronic or electrical device provided in an interior of the luggage bin, can be guided in a simple and secure manner from outside the luggage bin into the interior of the luggage bin.

In a preferred embodiment of the luggage bin, the shaft element of the cable guide arrangement passes through a first receiving opening formed in a side wall of the shell. Furthermore, the shaft element is preferably connected to the shell in a rotationally secure manner. The shaft element may be connected to the shell, for example, by a flange portion of the shaft element which extends radially outwards with respect to the central axis of the shaft element from an outer surface of the shaft element and rests on a portion of an inner surface of the side wall of the shell that adjoins the first receiving bore.

The shaft bearing element of the cable guide arrangement preferably passes through a second receiving bore formed in a side wall of the housing. Furthermore, the shaft bearing element is preferably connected to the housing in a rotationally secure manner. The rotationally secure connection between the shaft bearing element and the housing is preferably achieved by cooperation of the shaft bearing element with the cover element of the cable guide arrangement. In particular, a portion of the side wall of the housing that adjoins the second receiving bore may be received between a bearing bush of the shaft bearing element, which receives the shaft element, and the cover element of the cable guide arrangement. In particular, the cover element may rest on an outer surface of the side wall of the housing, whereas a surface of the bearing bush of the shaft bearing element facing the side wall of the housing may rest on an inner surface of the housing side wall.

BRIEF DESCRIPTION OF THE DRAWINGS

A preferred embodiment of the invention will now be described in greater detail with reference to the accompanying schematic drawings, in which FIG. 3 shows an interior of the luggage bin according to FIG. 2, FIGS. 4 to 6 show different three-dimensional views of the cable guide arrangement fitted in the luggage bin according to FIG. 1, FIGS. 7 and 8 show two exploded views of the cable guide arrangement fitted in the luggage bin according to FIG. 1, and FIGS. 9 to 14 show different three-dimensional detailed representations of the cable guide arrangement fitted in the luggage bin according to FIG. 1.

DETAILED DESCRIPTION OF THE PREFERRED EMBODIMENTS

Figure 1:
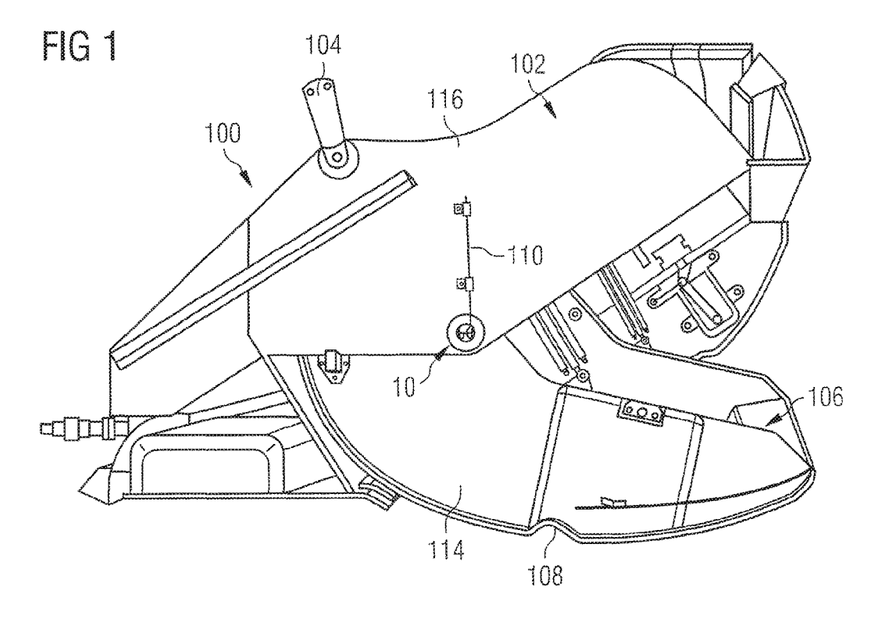
FIG. 1 shows a luggage bin equipped with a cable guide arrangement.

A luggage bin 100 shown in FIG. 1 is designed as an aircraft luggage bin which is to be mounted in the overhead region of an aircraft passenger cabin. The luggage bin comprises a housing 102 which can be fastened rigidly to a primary structural element (not shown in the figures) of the aircraft by means of a structural holder 104. The luggage bin 100 further comprises a shell 106 which is pivotable relative to the housing 102 between a closed transport position and an open loading or unloading position illustrated in FIG. 1. In the luggage bin 100 there is arranged an electrical consumer 108, which in the embodiment of a luggage bin 100 shown in the figures, is in the form of handle strip lighting. In order to supply the electrical consumer 108 with electrical energy, a cable 110 must be guided from outside the luggage bin 100 into an interior of the luggage bin 100, that is to say, an interior of the shell 106. To that end, the luggage bin 100 is equipped with a cable guide arrangement 10, which will be described in greater detail below.

Figure 3:
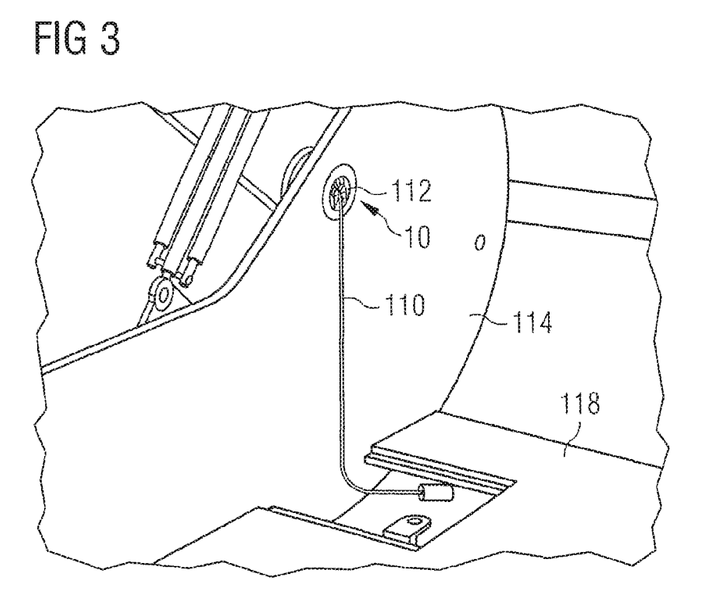
Figure 4:
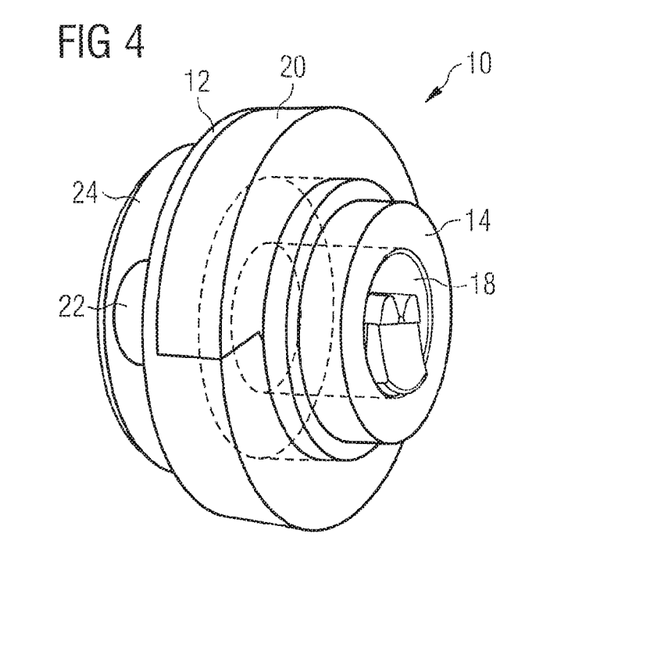
Figure 5:
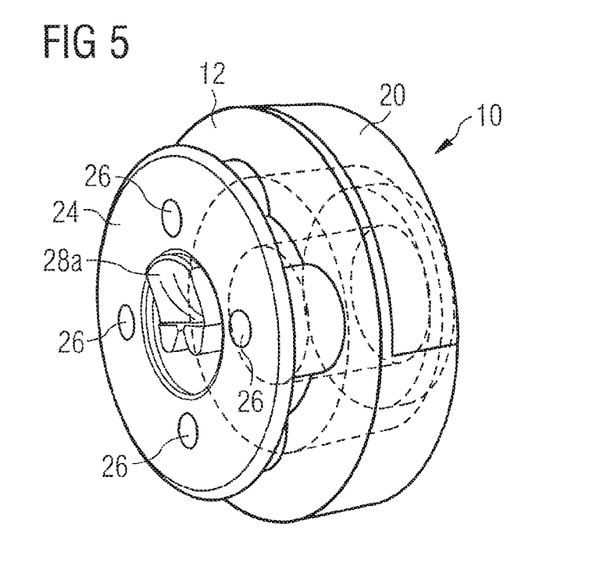
Figure 6:
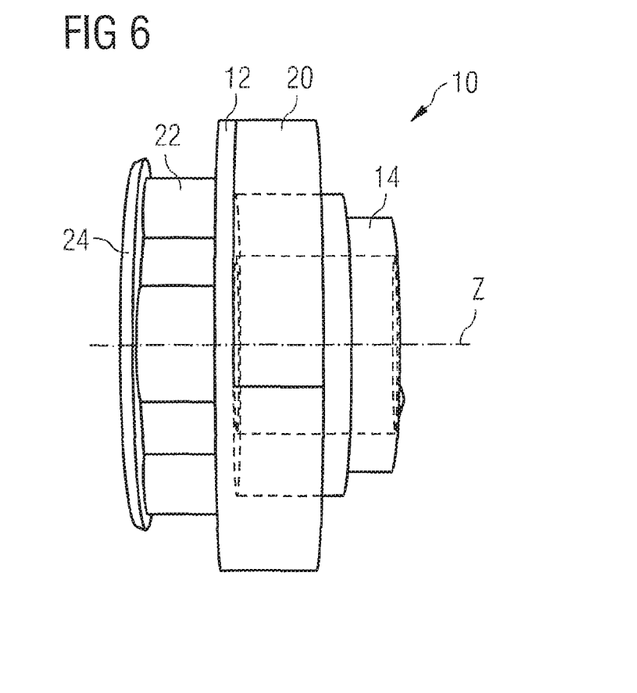
Figure 7:
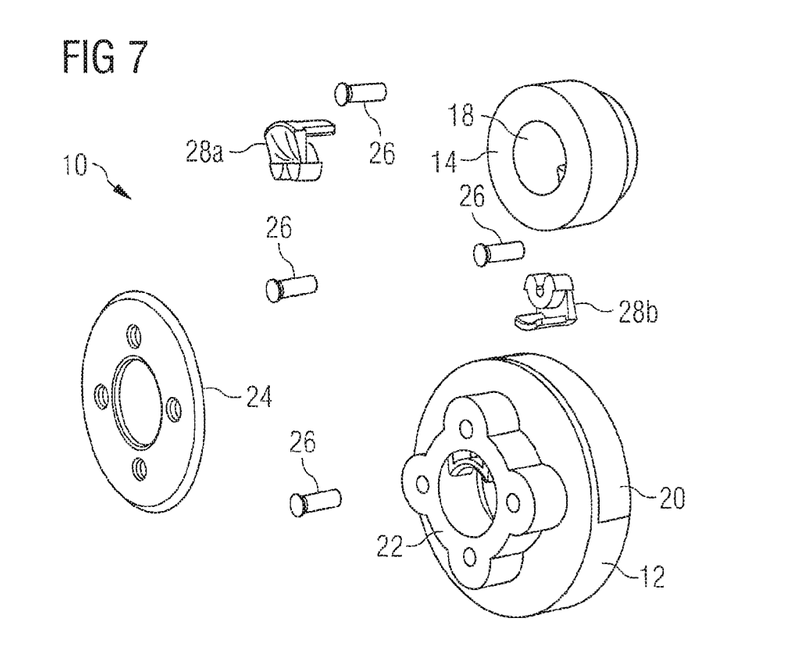
Figure 8:
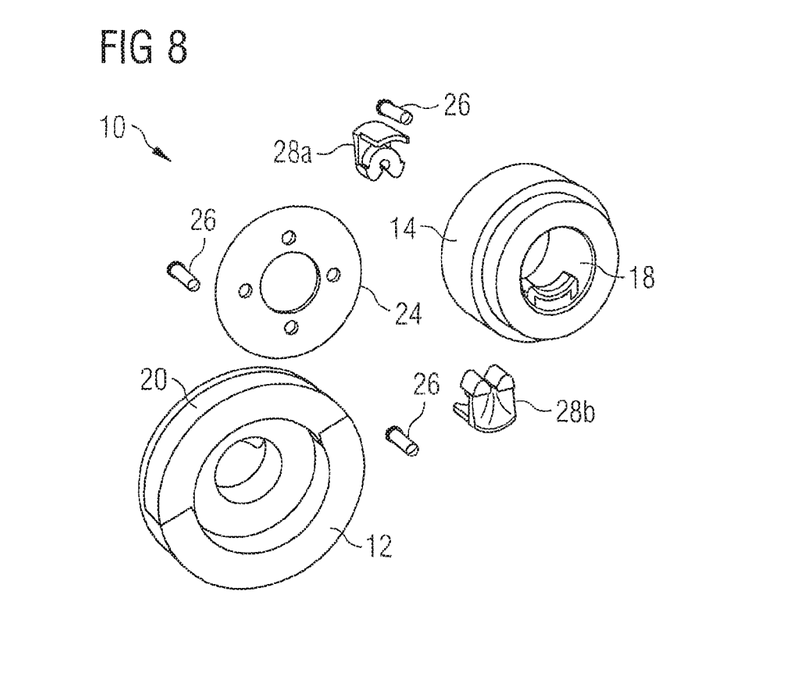
Figure 9:
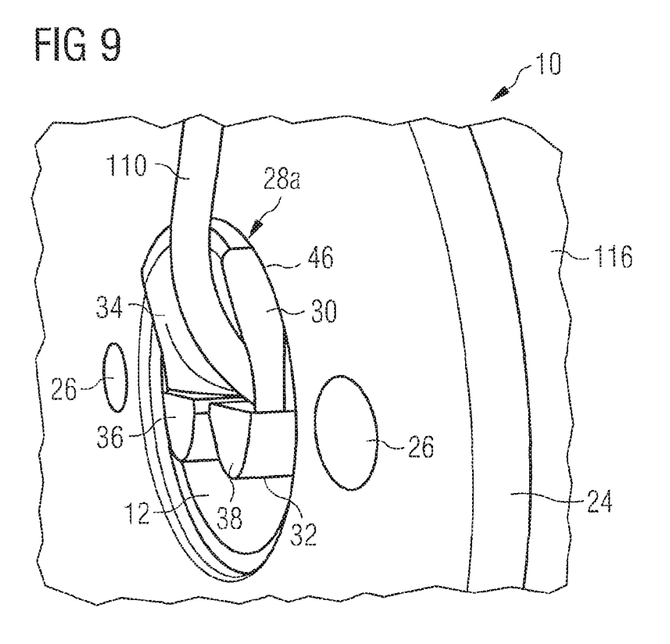
Figure 10:
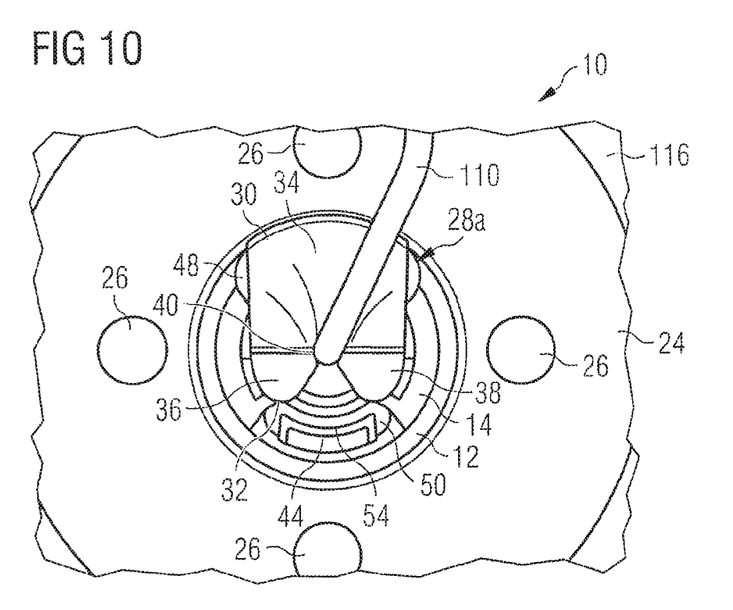
Figure 11:
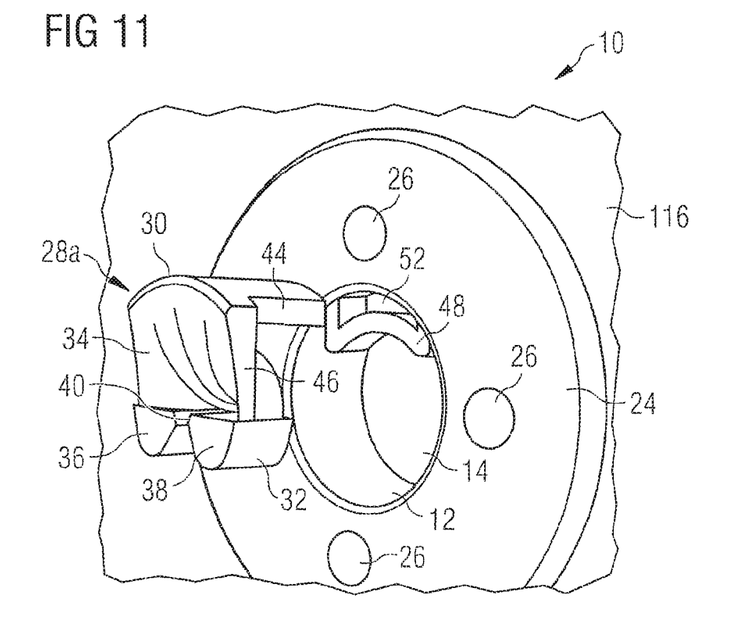
Figure 12:
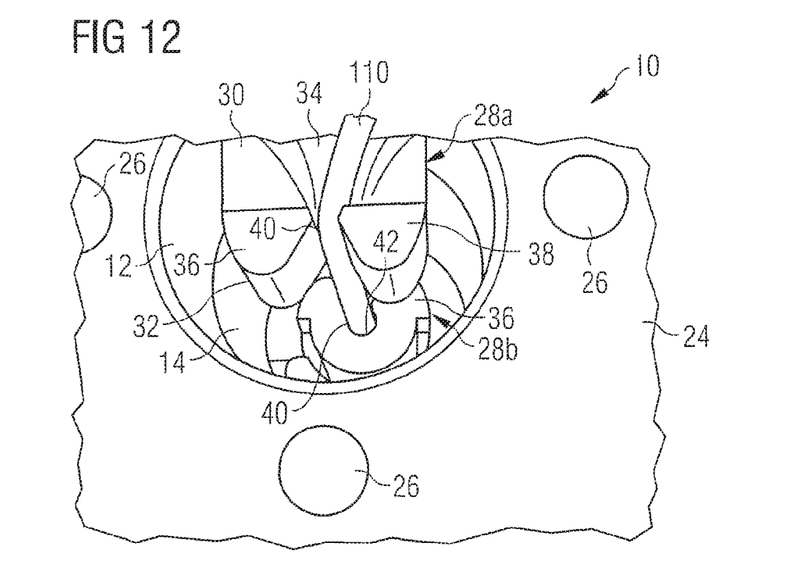
Figure 13:
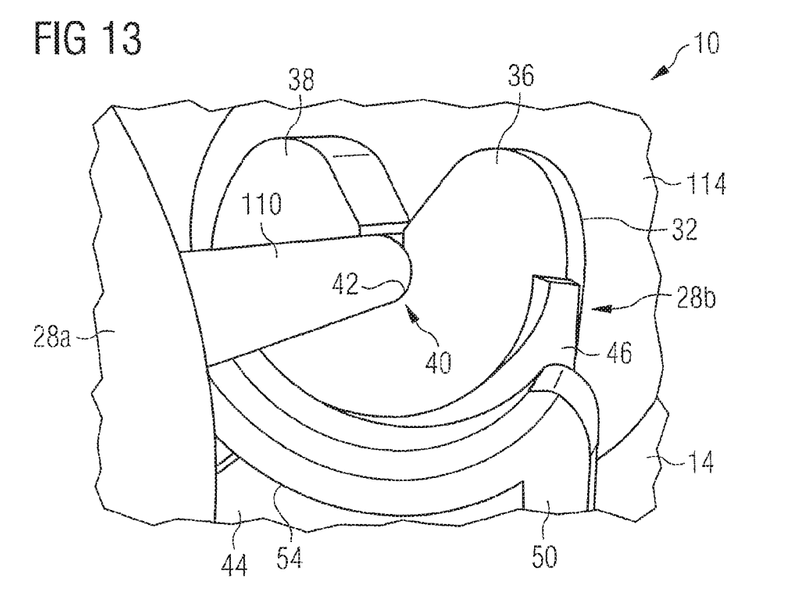
Figure 14:
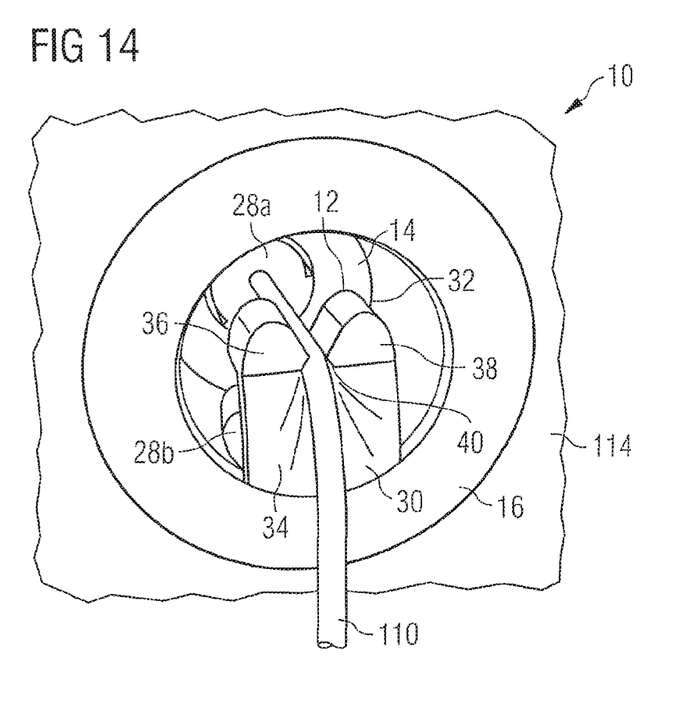

As is clear, in particular, from FIGS. 4 to 8, the cable guide arrangement 10 comprises a shaft bearing element 12 and a shaft element 14 which is rotatably mounted in the shaft bearing element 12. The shaft element 14 passes through a first receiving bore 112 which is formed in a side wall 114 of the shell 106 and is connected to the shell 106 in a rotationally secure manner. This is apparent, in particular, from FIG. 3, which shows an interior of the shell 106, and from FIG. 14, which illustrates a detailed view of the cable guide arrangement 10, seen from an interior of the shell 106. A flange portion 16 of the shaft element 14 serves for fastening the shaft element 14 to the shell 106 of the luggage bin, which flange portion extends radially outwards from an outer circumference of the shaft element 14, which is in hollow cylindrical form, and rests on an inner surface of the side wall 114 of the shell 106 when the cable guide arrangement 10 is mounted in the luggage bin 100.

A portion of the shaft element 14, which is to be received in the first receiving bore 112 formed in the side wall 114 of the shell 106, has a diameter which is smaller than a diameter of a portion of the shaft bearing element 14 which is to cooperate with the shaft bearing element 12. Furthermore, an opening 18 which extends along a central axis Z of the shaft element 14 passes through the shaft element 14. The shaft element 14, which forms the pivot axis about which the shell 106 of the luggage bin 100 is pivotable relative to the housing 102, is consequently designed in the form of a hollow shaft through which the cable 110 can be guided from outside the luggage bin 100 into the interior of the shell 106.

Figure 2:
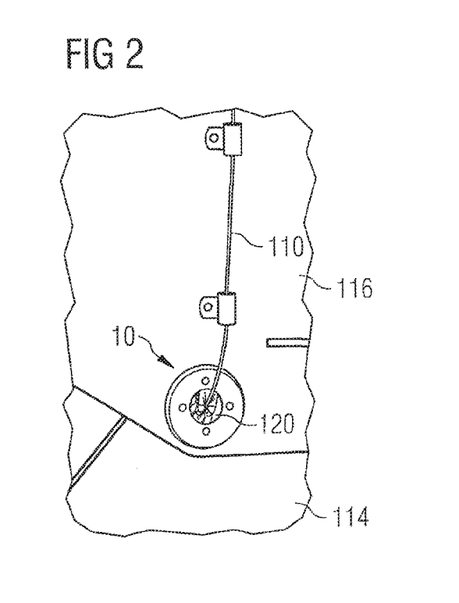
FIG. 2 shows a detailed representation of the luggage bin according to FIG. 1.

In particular, the cable 110, as illustrated in FIG. 2, is guided, with respect to the central axis Z of the shaft element 14, along an outer surface of a side wall 116 of the luggage bin housing 102 in the radial direction in the direction of the cable guide arrangement 10 and finally through the opening 18 formed in the shaft element 14 into the interior of the shell 106. In the interior of the shell 106, the cable 110 extends, with respect to the central axis Z of the shaft element 14 of the cable guide arrangement 10, in the radial direction along an inner surface of the side wall 114 of the shell 106 downwards in the direction of a floor 118 of the shell 106, see FIG. 3. Here there is situated an electrical separation in the form of a plug to the electronic component. This separation ensures that the shell 106 can also be separated from the housing 102 without dismantling the entire luggage bin 100.

The shaft bearing element 12 comprises a bearing bush 20 for receiving the shaft element 14 as well as a fastening portion 22 which, when the cable guide arrangement 10 is mounted in the luggage bin 100, passes through a second receiving bore 120 which is formed in the side wall 116 of the luggage bin housing 102. In order to allow the shaft bearing element 12 to be fastened in a rotationally secure manner to the housing 102 of the luggage bin 100, the cable guide arrangement 10 further has a cover element 24. When the cable guide arrangement 10 is mounted in the luggage bin 100, the cover element 24 is connected to the shaft bearing element 12 by means of four fastening pins 26 in such a manner that a portion of the side wall 116 of the luggage bin housing 102 that adjoins the second receiving bore 120 is received between the bearing bush 20 of the shaft bearing element 12 and the cover element 24 of the cable guide arrangement 10.

Finally, the cable guide arrangement 10 comprises a first and a second cable guide element 28a, 28b, see FIGS. 9 to 14, each of which show detailed representations of the cable guide arrangement 10 from different viewing angles. The first cable guide element 28a is connected, with respect to the central axis Z of the shaft element 14, in the region of a first axial end of the cable guide arrangement 10 to the shaft bearing element 12, see, in particular, FIG. 11. The second cable guide element 28b, on the other hand, is connected with respect to the central axis Z of the shaft element 14, in the region of a second axial end, opposite the first end, of the cable guide arrangement 10 to the shaft element 14, see, in particular, FIGS. 10, 13 and 14.

Between the cable guide elements 28a, 28b, the cable 110 is guided freely through the opening 18 formed in the shaft element 14. In particular, the first and second cable guide elements 28a, 28b are arranged at such a distance from one another, in the direction of the central axis Z of the shaft element 18, that the cable 110 is able to twist as a result of a torsional load which acts upon the cable 112 when the shaft element 114 rotates relative to the shaft bearing element 12, without the cable 110 being damaged. For example, the portion of the cable 110 which extends between the cable guide elements 28a, 28b can be 20 mm long. However, that distance can vary in dependence on the geometry and the resilience of the cable 110.

Each cable guide element 28a, 28b comprises a first guide portion 30 and a second guide portion 32. The first guide portion 30 serves to deflect the cable 110, which extends in the radial direction with respect to the central axis Z of the shaft element 14, in the direction of the central axis Z of the shaft element 14 with a defined bending radius, see, in particular, FIGS. 9, 10 and 14. The first guide portion 30 of each cable guide element 28a, 28b extends, with respect to the central axis Z of the shaft element 18, radially outwards from the second guide portion 32 and is provided with a bearing surface 34 for the cable 110. The bearing surface 34 has a curvature which is adapted to a defined bending radius with which the cable 110 is to be deflected in the direction of the central axis Z of the shaft element 14. In particular, the bearing surface 34 of the first guide portion 30 is curved in the manner of a funnel, the second guide portion 32 projecting beyond the first guide portion 30 in the axial direction, that is to say, in the direction of the central axis Z of the shaft element 14, see, in particular, FIGS. 9 and 11.

The second guide portion 32 of each cable guide element 28a, 28b serves to guide the cable 110 parallel to, in particular coaxially with, the central axis Z of the shaft element 14 through the opening 18 extending through the axial element 14. To that end, the second guide portion 32 has two guide ribs 36, 38 which extend parallel to one another and parallel to the central axis Z of the shaft element 14. The guide ribs 36, 38 receive the cable 110 between them and guide the cable 110 parallel to the central axis Z of the shaft element 14 through the opening 18 formed in the shaft element 14, see, in particular, FIGS. 11 to 14.

The second guide portion 32 is further provided with a receiving portion 40. The receiving portion 40 extends between the guide ribs 36, 38 parallel to the central axis Z of the shaft element 14 and has a receiving surface 42 adapted to a cross-section of the cable 110. In the exemplary embodiment of a cable guide arrangement 10 shown in the figures, the shape of the receiving surface 42 is adapted to the shape of an outer circumferential surface of a cable 110 having a circular cross-section. In particular, the receiving surface 42 extends over more than 50% of the outer circumference of the cable 110, as a result of which it is ensured that the cable 110 is held securely in the receiving portion 40, see, in particular, FIG. 13. Mutually facing side surfaces of the guide ribs 36, 38 are at a distance from one another, starting from the receiving portion 40, which increases in the radial direction with respect to the central axis Z of the shaft element 14. The cable 110 can thus be dismantled in a simple manner from the cable guide elements 28a, 28b, for example if the cable 110 is to be removed from the cable guide arrangement 10 for maintenance purposes.

Each cable guide element 28a, 28b comprises a fastening element 44 which extends parallel to the central axis Z of the shaft element 14 from a surface 46 of the first guide portion 30 opposite the bearing surface 34. The fastening element 44 formed on the first cable guide element 28a is engaged with a complementary fastening element 48 that is formed on the shaft bearing element 12, see FIG. 11. By contrast, the fastening element 44 of the second cable guide element 28b is engaged with a complementary fastening element 50 that is formed on the shaft element 14, see FIGS. 10, 13 and 14.

The fastening element 48 formed on the shaft bearing element 12 extends, with respect to the central axis Z of the shaft element 14, inwards in the radial direction from an inner surface of the shaft bearing element 12. Similarly, the fastening element 50 formed on the shaft element 14 extends, with respect to the central axis Z of the shaft element 14, inwards in the radial direction from an inner surface of the shaft element 14. Both fastening elements 48, 50 are further provided with an engagement opening 52, 54 which serves to receive the fastening elements 44 of the cable guide elements 28a, 28b.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A cable guide arrangement for use in a luggage bin comprising:
   a shaft bearing element,
   a shaft element rotatably mounted in the shaft bearing element and through which there passes an opening extending along a central axis of the shaft element, and
   at least one cable guide element connected to the shaft bearing element or the shaft element and comprising a first guide portion and a second guide portion, wherein the first guide portion is configured to deflect a cable, which extends in the radial direction with respect to the central axis of the shaft element, with a defined bending radius in the direction of the central axis of the shaft element, and wherein the second guide portion is configured to guide the cable parallel to the central axis of the shaft element through the opening extending through the shaft element.

2. The cable guide arrangement according to claim 1, wherein the first guide portion of the cable guide element extends radially outwards with respect to the central axis of the shaft element from the second guide portion and comprises a bearing surface for the cable.

3. The cable guide arrangement according to claim 2, wherein the bearing surface of the first guide portion has, at least in a region adjoining the second guide portion, a curvature which is adapted to the defined bending radius with which the cable is to be deflected in the direction of the central axis of the shaft element.

4. The cable guide arrangement according to claim 2, wherein the bearing surface of the first guide portion is curved in the manner of a funnel at least in a region adjoining the second guide portion.

5. The cable guide arrangement according to claim 1, wherein the second guide portion of the cable guide element comprises two guide ribs which extend parallel to one another and parallel to the central axis of the shaft element and which are configured to receive the cable between them and guide it parallel to the central axis of the shaft element through the opening extending through the shaft element.

6. The cable guide arrangement according to claim 5, wherein the second guide portion comprises a receiving portion which extends between the guide ribs parallel to the central axis of the shaft element, which receiving portion has a receiving surface for receiving the cable which is adapted to a cross-section of the cable.

7. The cable guide arrangement according to claim 6, wherein mutually facing side surfaces of the guide ribs are at a distance from one another that increases in the radial direction with respect to the central axis of the shaft element, starting from the receiving portion.

8. The cable guide arrangement according to claim 1, wherein the cable guide element comprises a fastening element which is engaged with a complementary fastening element formed on the shaft bearing element or on the shaft element.

9. The cable guide arrangement according to claim 8, wherein the fastening element of the cable guide element extends parallel to the central axis of the shaft element from a surface of the first guide portion located opposite the bearing surface.

10. The cable guide arrangement according to claim 8, wherein the complementary fastening element formed on one of the shaft bearing element or the shaft element extends in the radial direction with respect to the central axis of the shaft element from an inner surface of the one of the shaft bearing element or the shaft element and has an engagement opening for receiving the fastening element of the cable guide element.

11. The cable guide arrangement according to claim 1, wherein the cable guide arrangement comprises a first cable guide element, connected to the shaft bearing element, with respect to the central axis of the shaft element, in the region of a first end of the cable guide arrangement, and a second cable guide element, connected to the shaft element, with respect to the central axis of the shaft element, in the region of a second end of the cable guide arrangement that is opposite the first end, wherein the first and the second cable guide elements are arranged at such a distance from one another, in the direction of the central axis of the shaft element, that the cable, which is guided through the opening extending through the shaft element, is able to twist, as a result of a torsional load acting upon the cable when the shaft element rotates relative to the shaft bearing element, without the cable being damaged.

12. The cable guide arrangement according to claim 1, further comprising a cover element connected to the shaft bearing element.

13. The cable guide arrangement according to claim 1, wherein the luggage bin comprises an aircraft luggage bin.

14. A luggage bin, comprising:
   a housing,
   a shell pivotable relative to the housing between a closed transport position and an open loading and unloading position, and
   a cable guide arrangement comprising:
   a shaft bearing element,
   a shaft element rotatably mounted in the shaft bearing element and through which there passes an opening extending along a central axis of the shaft element, and
   at least one cable guide element connected to the shaft bearing element or the shaft element and comprising a first guide portion and a second guide portion, wherein the first guide portion is configured to deflect a cable, which extends in the radial direction with respect to the central axis of the shaft element, with a defined bending radius in the direction of the central axis of the shaft element, and wherein the second guide portion is configured to guide the cable parallel to the central axis of the shaft element through the opening extending through the shaft element, wherein a pivot axis about which the shell is pivotable relative to the housing is formed by the shaft element of the cable guide arrangement.

15. The luggage bin according to claim 14, wherein the shaft element of the cable guide arrangement passes through a first receiving bore formed in a side wall of the shell and is connected in a rotationally secure manner to the shell.

16. The luggage bin according to claim 14, wherein the shaft bearing element of the cable guide arrangement passes through a second receiving bore formed in a side wall of the housing and is connected in a rotationally secure manner to the housing, wherein a portion of the side wall of the housing that adjoins the second receiving bore is received between a bearing bush of the shaft bearing element and the cover element of the cable guide arrangement.

* * * * *